United States Patent
Hasegawa (10) Patent No.: US 7,609,039 B2
(45) Date of Patent: Oct. 27, 2009

(54) CONTROLLER AND CONTROL METHOD FOR DC-DC CONVERTER

(75) Inventor: Morihito Hasegawa, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 0 days.

(21) Appl. No.: 11/370,880

(22) Filed: Mar. 9, 2006

(65) Prior Publication Data

US 2007/0057658 A1    Mar. 15, 2007

(30) Foreign Application Priority Data

Sep. 9, 2005    (JP)    ............... 2005-263007

(51) Int. Cl.
*G05F 1/40*    (2006.01)
(52) U.S. Cl. ..................... 323/273; 323/282
(58) Field of Classification Search ............... 323/268, 323/269, 271, 273, 276, 282
See application file for complete search history.

(56) References Cited

U.S. PATENT DOCUMENTS

| | | | |
|---|---|---|---|
| 4,502,152 A | | 2/1985 | Sinclair |
| 4,881,023 A | * | 11/1989 | Perusse et al. ............ 323/266 |
| 5,083,078 A | | 1/1992 | Kubler et al. |
| 5,258,701 A | | 11/1993 | Pizzi et al. |
| 5,414,341 A | * | 5/1995 | Brown ..................... 323/268 |
| 5,548,204 A | * | 8/1996 | Armstrong et al. ......... 323/265 |
| 6,150,798 A | | 11/2000 | Ferry et al. |
| 6,636,023 B1 | * | 10/2003 | Amin ..................... 323/268 |
| 7,084,612 B2 | * | 8/2006 | Zinn ...................... 323/266 |
| 2003/0026051 A1 | * | 2/2003 | Shi et al. ................. 361/18 |
| 2005/0046405 A1 | * | 3/2005 | Trafton et al. ............. 323/308 |

FOREIGN PATENT DOCUMENTS

| | | |
|---|---|---|
| EP | 0 949 739 A2 | 10/1999 |
| JP | 60-079416 A | 5/1985 |
| JP | 11-353040 A | 12/1999 |
| JP | 2003-9515 A | 1/2003 |
| JP | 2005-168229 A | 6/2005 |

OTHER PUBLICATIONS

Taiwan Office Action dated Jan. 9, 2009 with English translation and Search Report.

* cited by examiner

*Primary Examiner*—Adolf Berhane
(74) *Attorney, Agent, or Firm*—Arent Fox LLP

(57) ABSTRACT

A DC-DC converter having conversion efficiency that is not lowered by input voltage change. A mode control circuit of the DC-DC converter monitors the input voltage, output voltage generated from the input voltage, and output current. The output current changes in accordance with the output voltage. Based on the input voltage, output voltage, and consumption current of a controller of the DC-DC converter, the mode control circuit generates a signal that is in accordance with load current in which efficiency of a switching regulator and efficiency of a linear regulator are substantially the same. The mode control circuit further compares a signal corresponding to the output current and the signal that is in accordance with the load current to generate a mode control signal. The controller operates the DC-DC converter as the switching regulator or the linear regulator in accordance with the mode control signal.

17 Claims, 7 Drawing Sheets

CONTROLLER AND CONTROL METHOD FOR DC-DC CONVERTER

CROSS-REFERENCE TO RELATED APPLICATIONS

This application is based upon and claims the benefit of priority from the prior Japanese Patent Application No.2005-263007, filed on Sep. 9, 2005, the entire contents of which are incorporated herein by reference.

BACKGROUND OF THE INVENTION

The present invention relates to a DC-DC converter, and more particularly, to a controller and a control method for a DC-DC converter.

Many portable electronics devices are being used in recent years. A portable device uses a battery as a drive power supply. The output voltage of the battery decreases as the device is used or as the battery is discharged. An electronics device includes a DC-DC converter for converting the voltage of its battery to a constant voltage. The conversion efficiency of the DC-DC converter affects the operation time of the electronics device that is operated by the battery. The operation of the electronics device may require a different amount of current. In view of this, the electronics device requires a DC-DC converter having high conversion efficiency for any current amount and a controller for such a DC-DC converter.

In the prior art, a portable electronics device uses a switching DC-DC converter (hereafter referred to as a "switching regulator"), which is compact and has high conversion efficiency. The switching regulator is a pulse width modulation (PWM) regulator. The PWM regulator keeps the output voltage substantially constant by controlling the pulse width of a pulse signal for driving its main switching transistor in accordance with the output voltage or the output current.

To extend the life of the battery and extend the operation time of the electronics device that is operated using the battery, the electronics device may reduce its consumption current. In such a low load state, the conversion efficiency of the PWM switching regulator is extremely low. The reasons for this will be described below.

Figure 1:
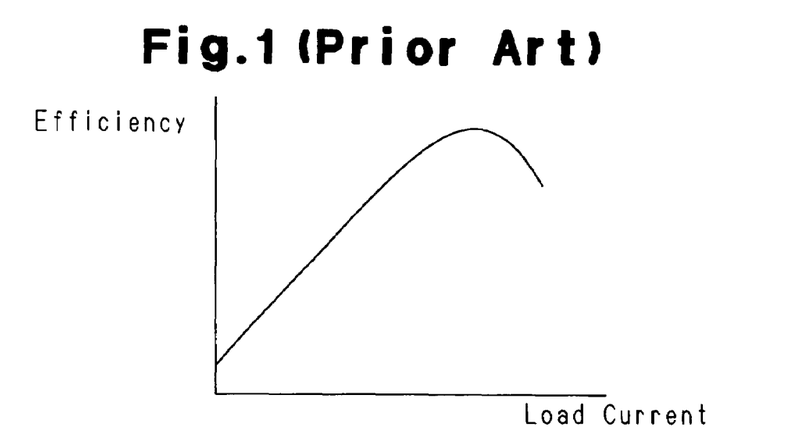
FIG. 1 is a graph showing the relationship between the load current and the efficiency of a switching regulator.

The power loss of the switching regulator includes loss that is dependent on the output current of the regulator and a fixed loss that is not dependent on the output current of the regulator. The loss dependent on the output current includes power loss that is generated by the ON-resistance of transistors in the regulator. The fixed loss that is not dependent on the output current may include power loss that is generated when a main switching transistor of the regulator is activated and inactivated, and a loss that is generated by power consumption of the regulator itself. When the output current increases (the difference between the input current and the output current becoming small), the loss dependent on the output current increases accordingly but the fixed loss remains unchanged. In this case, the conversion efficiency of the switching regulator is not low as a whole. However, when the output current decreases (the difference between the input current and the output current becoming large), the ratio of the fixed loss to the loss dependent on the output current increases. In this case, the conversion efficiency of the switching regulator decreases as shown in FIG. 1.

The fixed loss of the switching regulator is proportional to the switching frequency for activating and inactivating the main switching transistor. Thus, the power loss may be reduced by lowering the switching frequency. However, ripple of the output voltage increases when the switching frequency is lowered.

Figure 2:
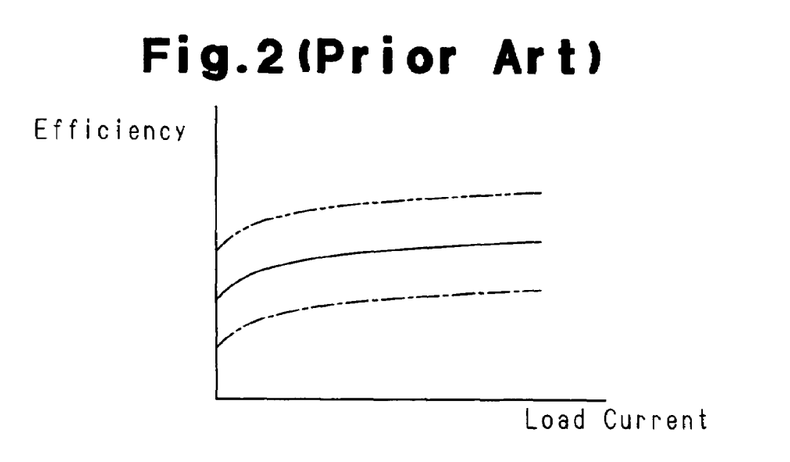
FIG. 2 is a graph showing the relationship between the load current and the efficiency of a linear regulator.

Japanese Laid-Open Patent Publication No. 2003-9515 describes a power supply system that includes a switching regulator and a linear regulator. The system switches between the two regulators in accordance with the load current. The loss of the linear regulator is dependent on the difference between the input voltage and the output voltage. Further, the loss of the linear regulator is not dependent on the difference between the input current and the output current. The linear regulator has high conversion efficiency in a low load state, as shown in FIG. 2.

Figure 3:
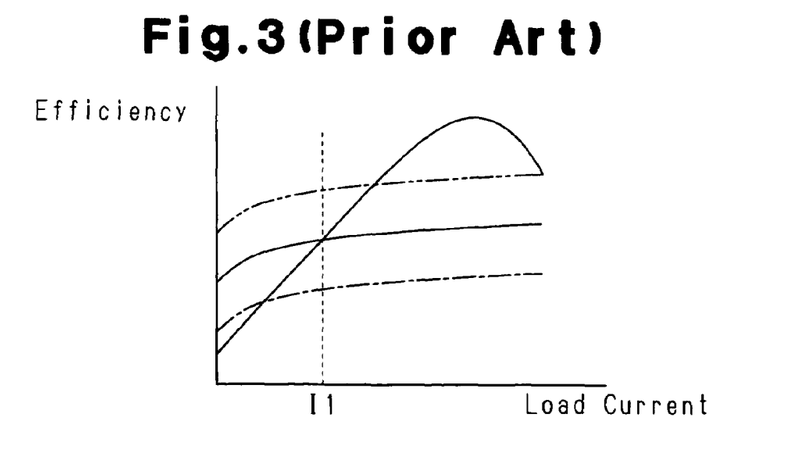
FIG. 3 is a schematic diagram showing switching between a switching regulator having the characteristic shown in FIG. 1 and a linear regulator having the characteristic shown in FIG. 2.

As shown in FIG. 3, the DC-DC converter realizes high conversion efficiency irrespective of the output current when the DC-DC converter is switched between the switching regulator and the linear regulator at a load current I1 with which the efficiency of the switching regulator and the efficiency of the linear regulator substantially coincide with each other.

SUMMARY OF THE INVENTION

The input voltage of the DC-DC converter included in the portable electronics device changes as the battery is used. However, the output voltage of the DC-DC converter is kept substantially constant. Thus, the voltage difference between the input voltage and the output voltage changes as the device is used. The load current changes in accordance with the state of use status of the electronics device.

Figure 4:
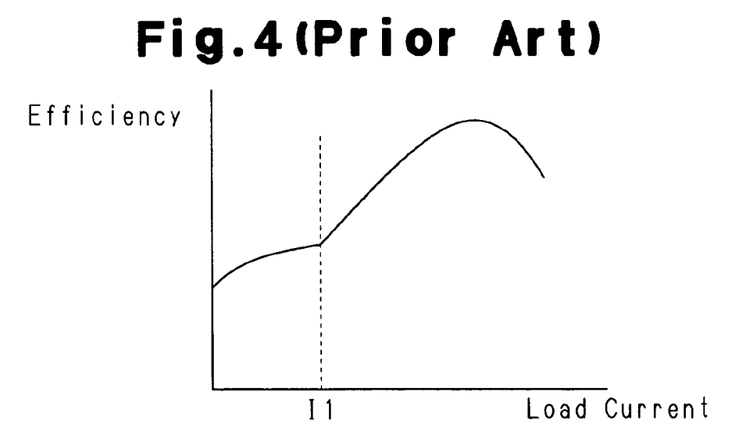
FIG. 4 is a schematic diagram showing switching between a switching regulator having the characteristic shown in FIG. 1 and a linear regulator having the characteristic indicated by the solid line in FIG. 2.
Figure 5:
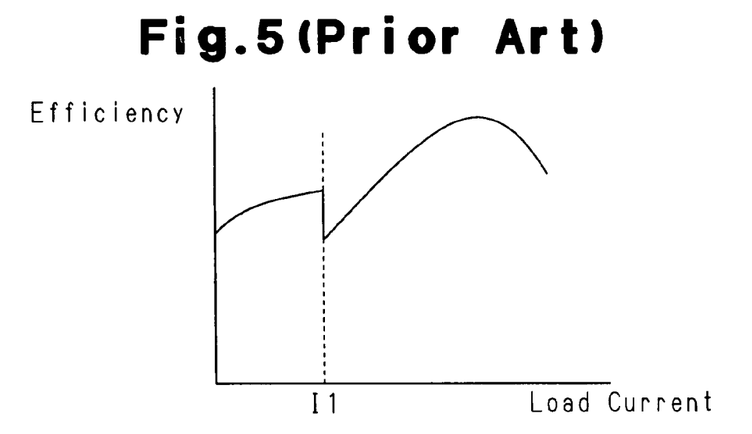
FIG. 5 is a schematic diagram showing switching between a switching regulator having the characteristic shown in FIG. 1 and a linear regulator having the characteristic indicated by the double-dashed line in FIG. 2.
Figure 6:
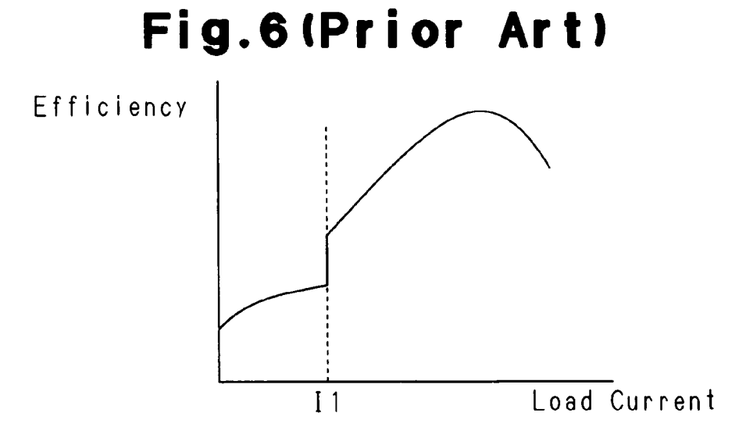
FIG. 6 is a schematic diagram showing switching between a switching regulator having the characteristic shown in FIG. 1 and a linear regulator having the characteristic indicated by the single-chained line in FIG. 2.

The power loss of the switching regulator is not affected much by the voltage difference between the input voltage and the output voltage. However, the power loss of the linear regulator is determined by the voltage difference between the input voltage and the output voltage. When the voltage difference between the input voltage and the output voltage is small, the efficiency of the regulator is high as indicated by the double-dashed line in FIG. 2. When the voltage difference is large, the efficiency of the regulator is low as indicated by the single-dashed line in FIG. 2. Thus, when the DC-DC converter is set to switch between the switching regulator and the linear regulator at the load current I1 as shown in FIG. 4, satisfactory conversion efficiency may not be obtained. Further, the voltage difference obtained when the DC-DC converter is set may differ from the voltage difference obtained when the DC-DC converter is actually used. In this case, the efficiency of the DC-DC converter before switching at the load current I1 may differ greatly from the efficiency of the DC-DC converter after switching at the load current I1 as shown in FIGS. 5 and 6. More specifically, when the voltage difference between the input voltage and the output voltage is small, the DC-DC converter is not used as the linear regulator although the efficiency of the linear regulator is higher than the efficiency of the switching regulator as shown in FIG. 5. When the voltage difference between the input voltage and the output voltage is large, the DC-DC converter is used as the linear regulator although the efficiency of the switching regulator is higher than the efficiency of the linear regulator as shown in FIG. 6. In this way, the conversion efficiency of the DC-DC converter may be lowered when the input voltage changes.

The present invention provides a DC-DC converter, a controller for a DC-DC converter, and a method for controlling a DC-DC converter having conversion efficiency that is not lowered when the input voltage changes.

One aspect of the present invention is a DC-DC converter including a switching regulator for generating output voltage from input voltage and controlling the output voltage to be constant. A linear regulator generates the output voltage from the input voltage and controls the output voltage to be constant. A controller operates either one of the switching regulator and the linear regulator. The controller monitors the input voltage, the output voltage, and output current, in which the output current changes in accordance with the output voltage. The controller selects the one of the switching regulator and the linear regulator having higher efficiency in accordance with the output current based on the monitoring result.

Another aspect of the present invention is a controller for a DC-DC converter including a switching regulator, for generating output voltage from input voltage and controlling the output voltage to be constant, and a linear regulator, for generating the output voltage from the input voltage and controlling the output voltage to be constant. The controller operates either one of the switching regulator and the linear regulator. The controller includes a circuit for monitoring the input voltage, the output voltage, and an output current. The output current changes in accordance with the output voltage. The circuit selects the one of the switching regulator and the linear regulator having higher efficiency in accordance with the output current based on the monitoring result.

A further aspect of the present invention is a method for controlling a DC-DC converter that generates output voltage from input voltage. The DC-DC converter includes a switching regulator for generating the output voltage from the input voltage and controlling the output voltage to be constant. A linear regulator generates the output voltage from the input voltage and controls the output voltage to be constant. The method includes monitoring the input voltage, the output voltage, and output current, in which the output current changes in accordance with the output voltage. The method further includes selectively operating the one of the switching regulator and the linear regulator having higher efficiency in accordance with the output current based on the monitoring result of the input voltage, the output voltage, and the output current.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

A DC-DC converter 12 according to a first embodiment of the present invention will now be described with reference to the drawings.

Figure 10:
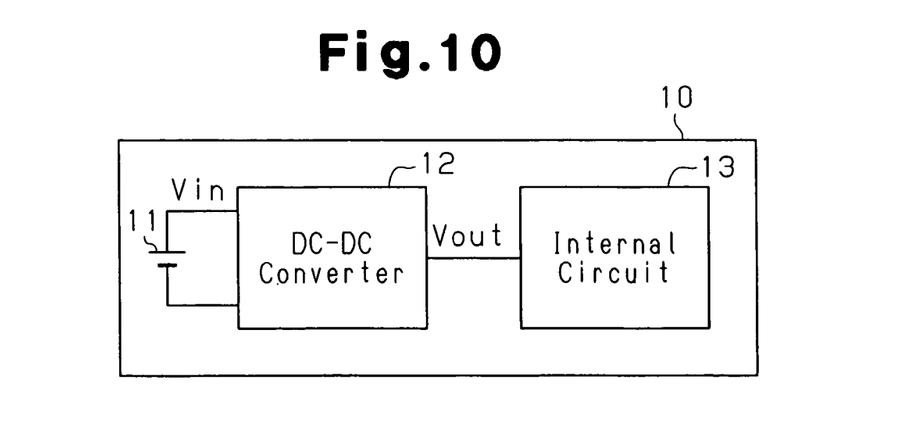
FIG. 10 is a schematic block diagram of an electronics device including the DC-DC converter of FIG. 7.

FIG. 10 is a schematic block diagram of an electronics device 10 including the DC-DC converter 12. The electronics device 10 is portable, and is driven using power supplied from its built-in battery 11. The battery 11 is connected to the DC-DC converter 12 as a power supply circuit. The DC-DC converter 12 is connected to an internal circuit 13, such as a CPU. The DC-DC converter 12 converts an input voltage Vin supplied from the battery 11 to an output voltage Vout, which is a constant voltage for operating the internal circuit 13. The DC-DC converter 12 supplies the output voltage Vout to the internal circuit 13.

The configuration of the DC-DC converter 12 will now be described.

Figure 7:
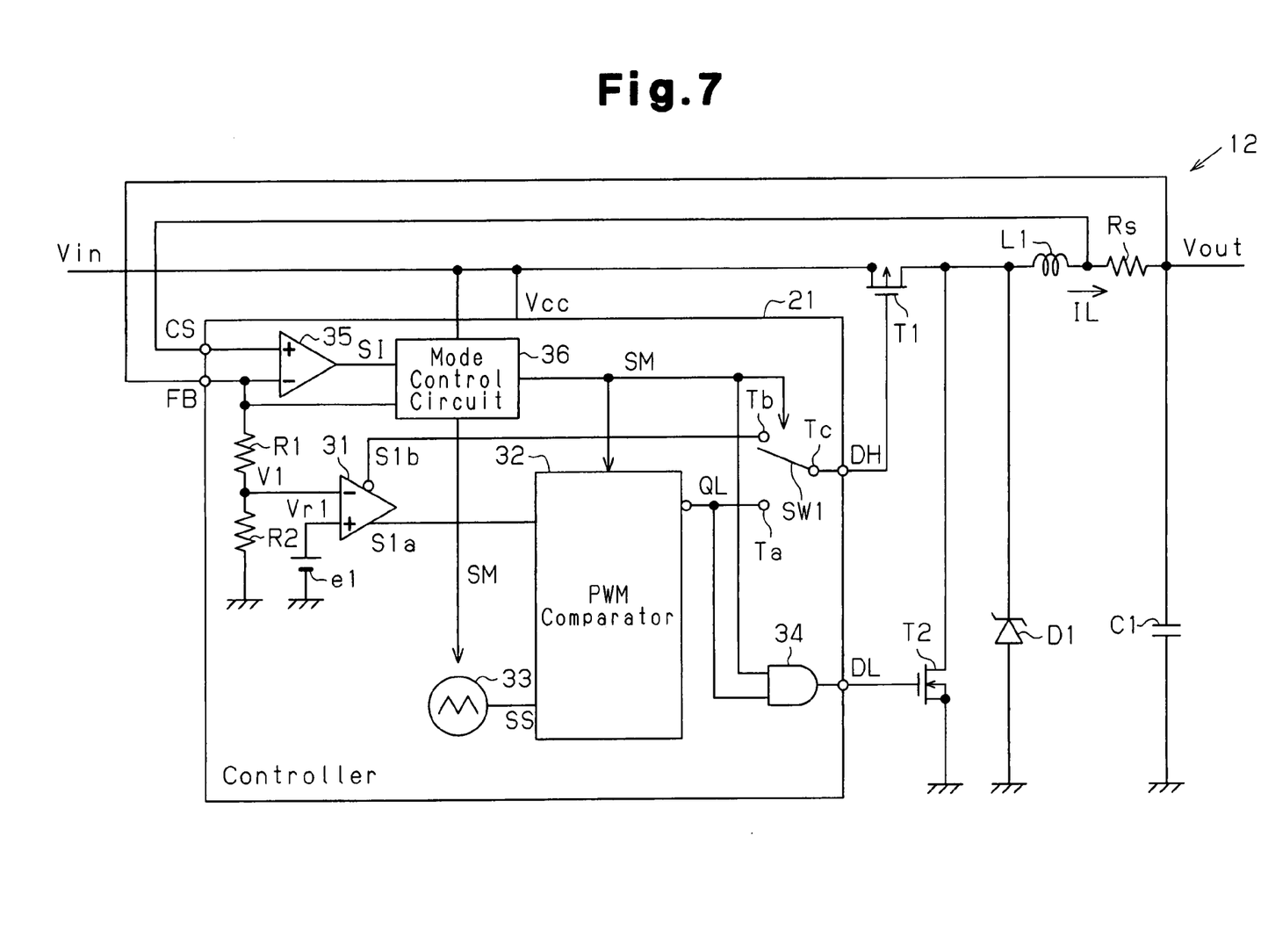
FIG. 7 is a schematic block diagram of a DC-DC converter according to a first embodiment of the present invention.

Referring to FIG. 7, the DC-DC converter 12, which is a voltage control mode DC-DC converter, includes a controller 21, a first output transistor T1, a second output transistor T2, a choke coil L1, a diode D1, a smoothing capacitor C1, and a current detection resistor Rs.

The controller 21 provides the gate of the output transistor T1 with a control signal DH, and the gate of the output transistor T2 with a control signal DL. The output transistor T1, which is a P-channel MOS transistor, includes a source supplied with the input voltage Vin and a drain connected to the output transistor T2. The output transistor T2, which is an N-channel MOS transistor, includes a source connected to a low potential power supply (ground) and a drain connected to the output transistor T1. The output transistor T1 is activated and inactivated in response to the control signal DH. The output transistor T2 is activated and inactivated in response to the control signal DL.

A node between the drain of the output transistor T1 and the drain of the output transistor T2 is connected to the first terminal of the choke coil L1. The second terminal of the choke coil L1 is connected via the current detection resistor Rs to the internal circuit 13, which functions as a load (refer to FIG. 10).

The first terminal of the choke coil L1 is connected to the cathode of the diode D1. The anode of the diode D1 is grounded. The current detection resistor Rs has a first terminal connected to the second terminal of the choke coil L1 and a second terminal connected to the first terminal of the smoothing capacitor C1, which smoothes the output voltage Vout of the DC-DC converter 12. The second terminal of the capacitor C1 is grounded. Voltage at a node between the choke coil L1 and the current detection resistor Rs is fed back to the controller 21 as a feedback signal CS. The output voltage Vout is fed back to the controller 21 as a feedback signal FB.

The controller 21 operates based on the input voltage Vin that is supplied as a power supply voltage Vcc.

The controller 21 includes an error amplifier 31, a PWM comparator 32, a triangular wave oscillator 33, an AND circuit 34 serving as a signal control circuit, a voltage amplifier 35, a mode control circuit 36, first and second resistors R1 and R2, a reference power supply e1, and a switch SW1 serving as a selection circuit.

The feedback signal FB is provided to a first terminal of the first resistor R1. A second terminal of the first resistor R1 is connected to a first terminal of the second resistor R2. A second terminal of the second resistor R2 is grounded. The first resistor R1 and the second resistor R2 form a voltage dividing circuit. The voltage dividing circuit generates a comparison voltage V1 by dividing the output voltage Vout, which is input as the feedback signal FB, with the first and second resistors R1 and R2. The comparison voltage V1 is supplied to the error amplifier 31.

The error amplifier 31 has an inverting input terminal and a non-inverting input terminal. The inverting input terminal of the error amplifier 31 is supplied with the comparison voltage V1. The non-inverting input terminal of the error amplifier 31 is supplied with a reference voltage Vr1 from the reference power supply e1. The error amplifier 31 has a non-inverting output terminal and an inverting output terminal. In accordance with the result of comparison between the reference voltage Vr1 and the comparison voltage V1, the error amplifier 31 amplifies the voltage difference between the reference voltage Vr1 and the comparison voltage V1 to generate error signals S1a and S1b, which are complementary to each other. When the comparison voltage V1 supplied to its inverting input terminal is lower than the reference voltage Vr1 supplied to the non-inverting input terminal, the error amplifier 31 raises the voltage of the first error signal S1a in accordance with the voltage difference. When the comparison voltage V1 is higher than the reference voltage Vr1, the error amplifier 31 lowers the voltage of the first error signal S1a in accordance with the voltage difference. The second error signal S1b changes in a manner reverse to the first error signal S1a.

The first error signal S1a is provided to the PWM comparator 32. The PWM comparator 32 has a non-inverting input terminal and an inverting input terminal. The non-inverting input terminal of the PWM comparator 32 is provided with the first error signal S1a from the error amplifier 31. The inverting input terminal of the PWM comparator 32 is provided with a signal generated in the triangular wave oscillator 33. The triangular wave oscillator 33 performs an oscillation operation and generates a triangular wave signal SS having a constant frequency. The inverting input terminal of the PWM comparator 32 is provided with the triangular wave signal SS.

The PWM comparator 32 compares the first error signal S1a from the error amplifier 31 and the triangular wave signal SS from the triangular wave oscillator 33 to generate a signal QL (switching control signal) having a level that is in accordance with the comparison result. The PWM comparator 32 outputs the signal QL from its inverting output terminal. The PWM comparator 32 generates a low (L) level signal QL when the voltage of the first error signal S1a is higher than the voltage of the triangular wave signal SS, and generates a high (H) level signal QL when the voltage of the first error signal S1a is lower than the voltage of the triangular wave signal SS. The signal QL is provided to the switch SW1 and the AND circuit 34.

The switch SW1 has two switch terminals Ta and Tb and a common terminal Tc. The first switch terminal Ta is provided with the signal QL. The second switch terminal Tb is provided with the second error signal S1b. The common terminal Tc of the switch SW1 is connected to the gate of the output transistor T1. The switch SW1 connects the common terminal Tc to the first switch terminal Ta or the second switch terminal Tb in response to the mode control signal SM that is provided from the mode control circuit 36. Thus, the switch SW1 selects one of the signal QL and the second error signal S1b, and outputs a control signal DH corresponding to the selected signal to the common terminal Tc. The control signal DH is provided to the output transistor T1. The output transistor T1 operates in response to the control signal DH.

The AND circuit 34 is a logic circuit having two input terminals. The first input terminal of the AND circuit 34 is provided with the signal QL. The second input terminal of the AND circuit 34 is provided with the mode control signal SM. The output terminal of the AND circuit 34 is connected to the gate of the output transistor T2. The AND circuit 34 performs an AND operation with the signal QL and the mode control signal SM to generate a control signal DL indicating the operation result. The control signal DL is set at an H level when the signal QL and the mode control signal SM both have an H level. Further, the control signal DL is set at an L level when at least one of the signal QL and the mode control signal SM have an L level. The control signal DL is provided to the output transistor T2. The output transistor T2 is activated and inactivated in response to the control signal DL.

The voltage amplifier 35 has an inverting input terminal and a non-inverting input terminal. The non-inverting input terminal of the voltage amplifier 35 is provided with the feedback signal CS. The inverting input terminal of the voltage amplifier 35 is provided with the feedback signal FB. The voltage amplifier 35 amplifies the voltage generated between the two terminals of the current detection resistor Rs based on an output current IL flowing through the current detection resistor Rs. Then, the voltage amplifier 35 provides an amplified signal SI to the mode control circuit 36.

The mode control circuit 36 monitors the input power and the output power of the DC-DC converter 12 to generate a mode control signal SM for changing the operation mode of the DC-DC converter 12 according to the monitoring result. The DC-DC converter 12 has operation modes including a PWM operation mode and a linear operation mode. In the PWM operation mode, the DC-DC converter 12 converts the input voltage Vin to the output voltage Vout by performing a PWM operation for changing the pulse width of each of the control signals DH and DL in accordance with the output voltage Vout. The control signals DH and DL are signals for controlling the activated and inactivated states of the output transistors T1 and T2. In the linear operation mode, the DC-DC converter 12 converts the input voltage Vin to the output voltage Vout by inactivating the output transistor T2 and controlling the gate voltage of the output transistor T1.

In other words, the mode control circuit 36 controls the DC-DC converter 12 to switch between a switching regulator, which converts the input voltage Vin to the output voltage Vout by activating and inactivating the output transistors T1 and T2, and a linear regulator, which converts the input voltage Vin to the output voltage Vout by controlling the gate voltage of the output transistor T1.

In detail, the mode control circuit 36 is provided with the signal SI from the voltage amplifier 35 and the feedback signal FB and is supplied with the input voltage Vin. The signal SI corresponds to the voltage difference between the two terminals of the current detection resistor Rs, that is, the output current IL. The feedback signal FB corresponds to the voltage at the output terminal of the DC-DC converter 12, that is, the output voltage Vout. In other words, the mode control circuit 36 is supplied with the input voltage Vin, the output voltage Vout, and the output current IL. Further, consumption current Icc of the entire controller 21 is predetermined in the mode control circuit 36. Based on the input voltage Vin, the output voltage Vout, the output current IL, and the consumption current Icc, the mode control circuit 36 generates the mode control signal SM in a manner that the conversion efficiency of the DC-DC converter 12 varies in a continuous manner before and after the operation mode of the DC-DC converter 12 is switched. In other words, the mode control circuit 36 generates the mode control signal SM for controlling the DC-DC converter 12 to be switched between the switching regulator and the linear regulator at the load current with which the efficiency of the switching regulator and the efficiency of the linear regulator are substantially the same as shown in FIG. 4.

The efficiency of the regulators will now be described.

The efficiency $\eta 1$ of the switching regulator is expressed as the ratio of the output power to the input power, that is, expressed as:

$$\eta 1 = (\text{output power})/(\text{input power})$$

The output power is obtained by multiplying the output voltage Vout by the output current Iout. The input power is obtained by multiplying the input voltage Vin by the input current Iin. Thus, the above expression is transformed into:

$$\eta 1 = (\text{Vout}*\text{Iout})/(\text{Vin}*\text{Iin})$$

The control loss Ploss of the switching regulator is the difference between the input power and the output power. The input power is expressed using the control loss Ploss as:

$$(\text{Vin}*\text{Iin}) = (\text{Vout}*\text{Iout}) + \text{Ploss}$$

As a result, the efficiency $\eta 1$ of the switching regulator is expressed as $$\eta 1 = (\text{Vout}*\text{Iout})/(\text{Vout}*\text{Iout} + \text{Ploss})$$

The control loss Ploss of the switching regulator is substantially constant. Thus, the switching regulator generates a constant output voltage Vout without being affected by the control loss Ploss. As the output current Iout increases, the ratio of the control loss Ploss to the output power becomes smaller and the efficiency of the switching regulator becomes higher. However, as the output current Iout decreases, the ratio of the control loss Ploss to the output power becomes larger. This lowers the efficiency of the switching regulator.

In the same manner as described above, the efficiency $\eta 2$ of the linear regulator is expressed as:

$$\eta 2 = \text{output power/input power} = (\text{Vout}*\text{Iout})/(\text{Vin}*\text{Iin})$$

The output current Iout and the input current Iin of the linear regulator are substantially equal to each other. The above expression is transformed into:

$$\eta 2 = \text{Vout}/\text{Vin}$$

In other words, the efficiency $\eta 2$ of the linear regulator is determined by the ratio of the input voltage Vin and the output voltage Vout.

To enable the conversion efficiency of the DC-DC converter 12 to vary in a continuous manner, the output current Iout (load current) with which the efficiency $\eta 1$ of the switching regulator and the efficiency $\eta 2$ of the linear regulator are substantially the same is calculated, and the DC-DC converter 12 is switched between the switching regulator and the linear regulator at the output current Iout. Since $\eta 1 = (\text{Vout}*\text{Iout})/(\text{Vout}*\text{Iout} + \text{Ploss})$ and $\eta 2 = \text{Vout}/\text{Vin}$ are satisfied, the output current Iout that satisfies $\eta 1 = \eta 2$, that is, the output current Iout that satisfies $(\text{Vout}*\text{Iout})/(\text{Vout}*\text{Iout} + \text{Ploss}) = \text{Vout}/\text{Vin}$ is expressed as:

$$\text{Iout} = \text{Ploss}/(\text{Vin} - \text{Vout})$$

The control loss Ploss is generated when the DC-DC converter 12 operates as the switching regulator. The control loss Ploss includes a first loss, which is caused by the current consumed when the controller 21 and the output transistors T1 and T2 operate, and a second loss, which is caused by the ON-resistance of the output transistors T1 and T2, the DC resistance of the choke coil L1, and the current detection resistor Rs. The first loss includes loss caused by the current Icc flowing through the controller 21. The second loss includes loss caused by the passage resistance of the output current Iout.

The second loss of the switching regulator is mainly caused when the output current Iout is large. In a range in which the output current Iout is small (in a small current range), the second loss caused is much smaller than the first loss caused by the current Icc flowing through the controller 21. The control loss Ploss of the DC-DC converter 12 operating as the switching regulator in the small current range may be considered to be loss caused by the current Icc flowing through the controller 21.

Thus, the control loss Ploss is expressed as:

$$\text{Ploss} = \text{Vin}*\text{Icc}$$

As a result, the output current Iout is expressed as:

$$\text{Iout} = (\text{Vin}/(\text{Vin} - \text{Vout}))*\text{Icc}$$

The current Icc flowing through the controller 21 is determined by the configuration of the controller 21. The current Icc is predetermined in the mode control circuit 36. The mode control circuit 36 monitors the input voltage Vin and the output voltage Vout to calculate the output current Iout (hereafter referred to as the calculated current Iout) in accordance with the predetermined current Icc using the above expression. The mode control circuit 36 compares the calculated current Iout with the present output current Icurr to generate a mode control signal SM based on the comparison result. The controller 21 enables the conversion efficiency of the DC-DC converter 12 to vary in a continuous manner by switching the operation mode of the DC-DC converter 12 between the PWM operation mode and the linear operation mode in accordance with the mode control signal SM.

As the present output current Icurr described above, the mode control circuit 36 is provided with the signal SI from the voltage amplifier 35 corresponding to the output current IL flowing through the current detection resistor Rs. The mode control circuit 36 compares the signal SI with the calculated current Iout. The mode control circuit 36 generates an H level mode control signal SM when the output current IL is larger than the calculated current Iout. Further, the mode control circuit 36 generates an L level mode control signal SM when the output current IL is smaller than the calculated current Iout. The mode control signal SM is provided to the switch SW1 and the AND circuit 34.

The switch SW1 connects the common terminal Tc to the first switch terminal Ta in response to an H level mode control signal SM so that a control signal DH having substantially the same level as the signal QL is output to the common terminal Tc. The AND circuit 34 generates a control signal DL having substantially the same level as the signal QL in response to an H level mode control signal SM. More specifically, the control signal DH and the control signal DL are both generated as signals having the same phase as the signal QL. The output transistor T1 and the output transistor T2 are activated and inactivated in a complementary manner. The DC-DC converter 12 operates as the switching regulator for converting the input voltage Vin to the output voltage Vout in accordance with the activated and inactivated states of the output transistors T1 and T2.

The switch SW1 connects the common terminal Tc to the second switch terminal Tb in response to an L level mode control signal SM so that a control signal DH having substantially the same level as the second error signal S1$b$ is output to the common terminal Tc. The AND circuit 34 generates an L level control signal DL in response to an L level mode control signal SM. Thus, current that is in accordance with the second error signal S1$b$ flows through the output transistor T1, and the output transistor T2 is inactivated. As a result, the DC-DC converter 12 operates as the linear regulator for converting the input voltage Vin to the output voltage Vout by controlling the ON-resistance of the output transistor T1.

The configuration of the mode control circuit 36 will now be described.

Figure 8:
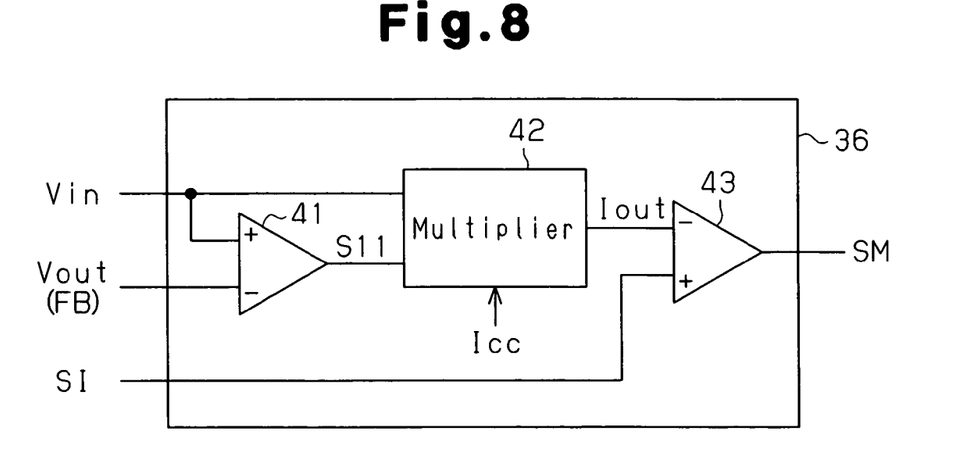
FIG. 8 is a schematic block diagram of a mode control circuit in the DC-DC converter of FIG. 7.

FIG. 8 is a schematic block diagram of the mode control circuit 36 included in the DC-DC converter 12 of FIG. 7. The mode control circuit 36 includes an operational amplifier 41, a multiplier 42, and a voltage comparator 43. The inverting input terminal of the operational amplifier 41 is provided with the feedback signal FB. In other words, the inverting input terminal of the operational amplifier 41 is supplied with the output voltage Vout. The non-inverting input terminal of the operational amplifier 41 is supplied with the input voltage Vin. The operational amplifier 41 generates a signal S11 having the voltage difference between the output voltage Vout and the input voltage Vin.

The multiplier 42 is supplied with the input voltage Vin and is provided with the signal S11 from the operational amplifier 41. The consumption current Icc of the entire controller 21 is predetermined in the multiplier 42. The multiplier 42 includes a multiplication-division element. The multiplier 42 divides the input voltage Vin by the signal S11 (Vin–Vout) and multiplies the division result by the consumption current Icc to generate the signal Iout, which indicates the multiplication result. The signal Iout corresponds to the calculated current Iout described above.

The voltage comparator 43 has an inverting input terminal and a non-inverting input terminal. The non-inverting input terminal of the voltage comparator 43 is provided with the signal Iout from the multiplier 42. The inverting input terminal of the voltage comparator 43 is provided with the signal SI. The signal SI corresponds to the present output current IL flowing through the current detection resistor Rs. The comparison between the signal Iout and the signal SI performed by the voltage comparator 43 corresponds to the comparison between the calculated current Iout and the output current IL. Thus, the voltage comparator 43 compares the calculated current Iout and the output current IL by comparing the signal Iout and the signal SI to generate a mode control signal SM based on the comparison result.

The mode control circuit 36 generates an H level mode control signal SM when the output current IL is larger than the calculated current Iout. Further, the mode control circuit 36 generates an L level mode control signal SM when the output current IL is smaller than the calculated current Iout.

Figure 9:
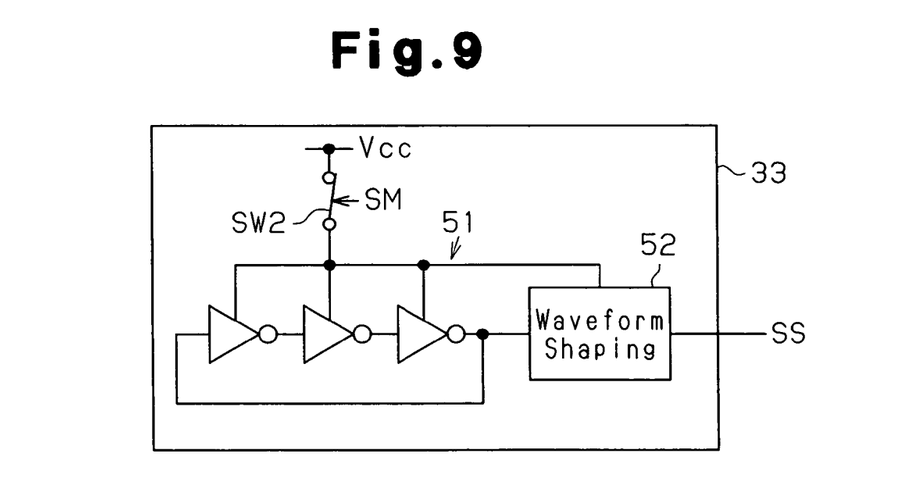
FIG. 9 is a schematic circuit diagram of a triangular wave oscillator of the DC-DC converter of FIG. 7.

As shown in FIG. 7, the PWM comparator 32 and the triangular wave oscillator 33 are provided with the mode control signal SM. As shown in FIG. 9, the triangular wave oscillator 33 includes a ring oscillator 51 and a waveform shaping circuit 52. The ring oscillator 51 includes an odd number of (three in FIG. 9) inverter circuits that are connected in a ring and generates a signal having a predetermined frequency. The waveform shaping circuit 52 shapes a signal output from the ring oscillator 51 into a triangular form and generates a triangular wave signal SS. The ring oscillator 51 and the waveform shaping circuit 52 are supplied with a power supply voltage Vcc via a switch SW2. The switch SW2 is activated in response to an H level mode control signal SM and inactivated in response to an L level mode control signal SM. The ring oscillator 51 and the waveform shaping circuit 52 are supplied with the power supply voltage Vcc when the mode control signal SM has an H level, that is, in a switching operation mode. In this case, the triangular wave oscillator 33 generates the triangular wave signal SS. The ring oscillator 51 and the waveform shaping circuit 52 are not supplied with the power supply voltage Vcc when the mode control signal SM has an L level, that is, in a linear operation mode. In this case, the triangular wave oscillator 33 consumes no power. Thus, the DC-DC converter 12 reduces power consumption in the linear operation mode. Although not shown in the drawings, the supply of the power supply voltage Vcc to the element forming the PWM comparator 32 is started or stopped in accordance with the mode control signal SM in the same manner as the ring oscillator 51. Thus, the PWM comparator 32 consumes less power. As a result, the DC-DC converter 12 reduces power consumption in the linear operation mode.

Figure 11:
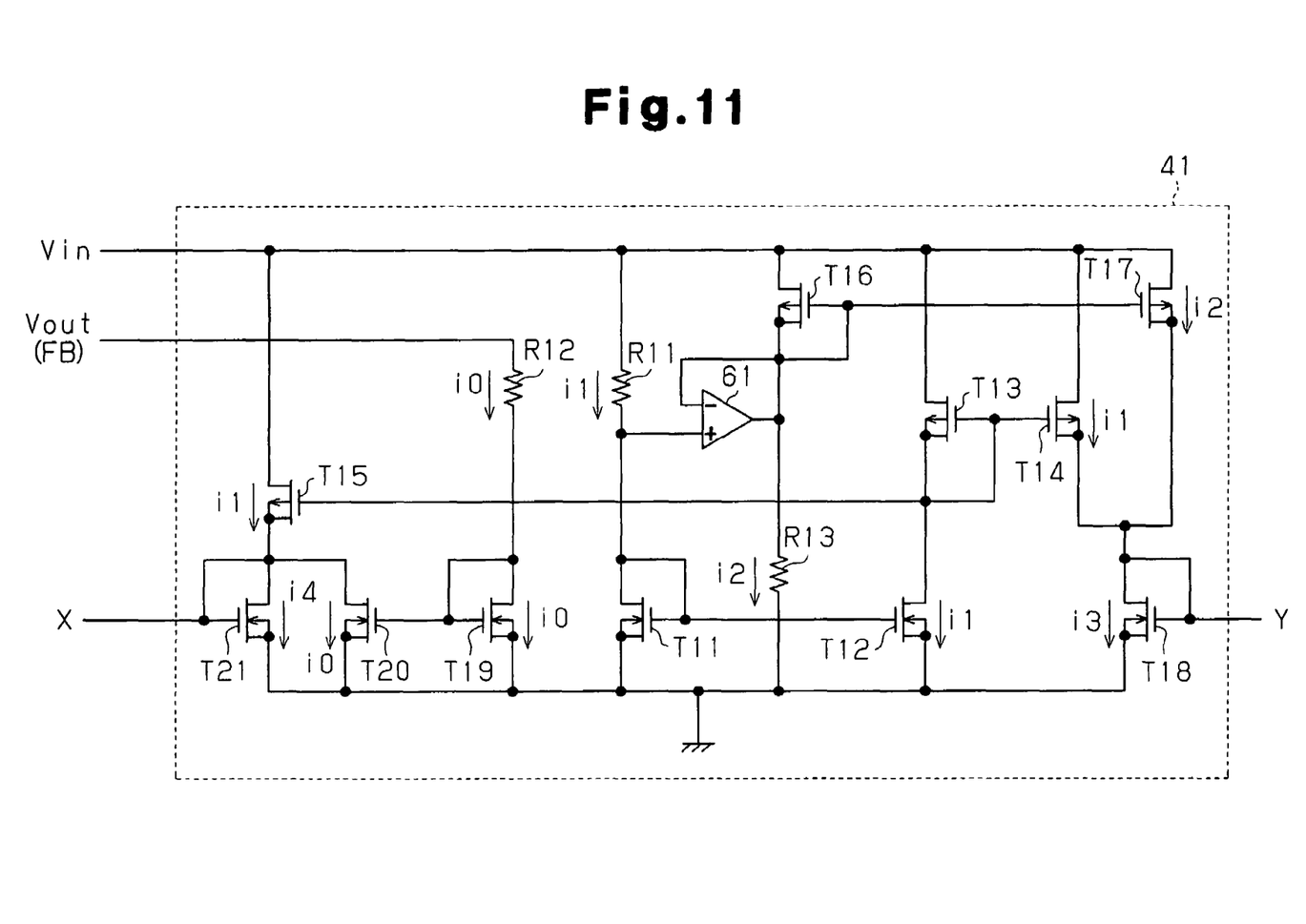
FIG. 11 is a schematic circuit diagram of an operational amplifier in the mode control circuit of FIG. 8.

FIG. 11 is a schematic circuit diagram of the operational amplifier 41 that forms the mode control circuit 36 of FIG. 8.

The operational amplifier 41 includes transistors T11 to T21, resistors R11 to R13, and an amplifier 61. The transistors T11, T12, and T18 to T21 are N-channel MOS transistors. The transistors T13 to T17 are P-channel MOS transistors.

The input voltage Vin is supplied to a first terminal of the resistor R11. A second terminal of the resistor R11 is connected to a non-inverting input terminal of the amplifier 61 and the drain of the transistor T11, which forms a current mirror circuit. The drain and the gate of the transistor T11 are connected to each other. The source of the transistor T11 is grounded. The gate of the transistor T11 is connected to the gate of the transistor T12, which forms the current mirror circuit. The drain of the transistor T12 is connected to the drain of the transistor T13. The source of the transistor T12 is grounded. The source of the transistor T13 is supplied with the input voltage Vin. The gate and the drain of the transistor T13 are connected to each other. The drain of the transistor T13 is connected to the gate of the transistor T15. The gate of the transistor T13 is connected to the gate of the transistor T14. The sources of the transistors T14 and the transistor T15 are supplied with the input voltage Vin.

The output terminal of the amplifier 61 is connected to the transistor T16. The source of the transistor T16 is supplied with the input voltage Vin. The drain of the transistor T16 is connected to the output terminal and the inverting input terminal of the amplifier 61. The gate and the drain of the transistor T16 are connected to each other. The gate of the transistor T16 is connected to the first terminal of the resistor R13. The second terminal of the resistor R13 is grounded. The gate of the transistor T16 is connected to the gate of the transistor T17. The source of the transistor T17 is provided with the input voltage Vin. The drain of the transistor T17 is connected to the drain of the transistor T14 and the drain of the transistor T18. The drain and the gate of the transistor T18 are connected to each other. The source of the transistor T18 is grounded. The gate of the transistor T18 is connected to an output terminal Y of the operational amplifier 41.

The output voltage Vout is supplied to a first terminal of the resistor R12. A second terminal of the resistor R12 is connected to the drain of the transistor T19 that forms a current mirror circuit. The drain and the gate of the transistor T19 are connected to each other. The source of the transistor T19 is grounded. The gate of the transistor T19 is connected to the gate of the transistor T20 that forms a current mirror circuit. The drain of the transistor T20 is connected to the drain of the transistor T15. The source of the transistor T20 is grounded. The drain of the transistor T15 is connected to the drain of the transistor T21. The drain and the gate of the transistor T21 are connected to each other. The source of the transistor T21 is grounded. The gate of the transistor T21 is connected to an output terminal X of the operational amplifier 41.

In the operational amplifier 41, the transistor T11 and the resistor R11 form a circuit for converting the input voltage Vin to the current i1. The voltage drop that occurs in the transistor T11, which operates as a diode, is equal to a threshold voltage Vth of the transistor T11. The current i1 flowing through the resistor R11 and the transistor T11 is expressed as:

$$i1=(Vin-Vth)/R11$$

The transistor T11 and the transistor T12 form a current mirror circuit. Thus, the current flowing through the transistor T12 is equal to the current i1 flowing through the transistor T11. Further, the transistor T12 is connected in series to the transistor T13. The current flowing through the transistor T13, which operates as a diode, is equal to the current i1 flowing through the transistor T12. Further, the transistor T13 and the transistor T14 form a current mirror circuit. The transistor T13 and the transistor T15 also form a current mirror circuit. The current flowing through the transistor T14 and the transistor T15 is equal to the current flowing through the transistor T13, that is, the current i1.

The amplifier 61 is a buffer circuit for setting a voltage drop that occurs in the resistor R13 at a voltage corresponding to the threshold voltage Vth of the transistor T11. The current i2 flowing through the resistor R13 is expressed as:

$$i2=Vth/R13$$

The transistor T16, which is connected in series to the resistor R13, operates as a diode. Thus, the current flowing through the transistor T16 is equal to the current i2 flowing through the resistor R13. Further, the transistor T16 and the transistor T17 form a current mirror circuit. Thus, the current flowing through the transistor T17 is equal to the current i2 flowing through the transistor T16.

The transistor T18 operates as a diode. Further, the transistor T18 is connected in series to a parallel circuit formed by the transistor T14 and the transistor T17. Thus, the current i3 flowing through the transistor T18 is equal to a current obtained by combining the current i1 flowing through the transistor T14 and the current i2 flowing through the transistor T17. The current i3 flowing through the transistor T18 is expressed as:

$$i3=i1+i2=((Vin-Vth)/R11)+(Vth/R13)$$

When the resistance of the resistors R11 and R13 is R, the current i3 is expressed as:

$$i3=Vin/R$$

As a result, the operational amplifier 41 generates current that is in accordance with the input voltage Vin at the output terminal Y connected to the gate of the transistor T18.

In the operational amplifier 41, the transistor T19 and the resistor R12 form a circuit for converting the output voltage Vout to the current i0. A voltage drop that occurs in the transistor T19, which operates as a diode, is equal to a threshold voltage Vth of the transistor T19. The current i0 flowing through the resistor R12 and the transistor T19 is expressed as:

$$i0=(Vout-Vth)/R12$$

The transistor T19 and the transistor T20 form a current mirror circuit. Thus, the current flowing through the transistor T20 is equal to the current i0 flowing through the transistor T19. The transistor T20 is connected in parallel to the transistor T21. A parallel circuit formed by the transistors T20 and T21 is connected in series to the transistor T15. The current i4 flowing through the transistor T21 is expressed by subtracting the current i0, which flows through the transistor T20, from the current i1, which flows through the transistor T15. The current i4 is expressed as:

$$i4=i1-i0=((Vin-Vth)/R11)-((Vout-Vth)/R12)$$

When the resistance of the resistors R11 and R12 is R, the current i4 is expressed as:

$$i4=(Vin-Vout)/R$$

As a result, the operational amplifier 41 generates current according to the voltage difference between the input voltage Vin and the output voltage Vout at the output terminal Y that is connected to the gate of the transistor T21.

Figure 12:
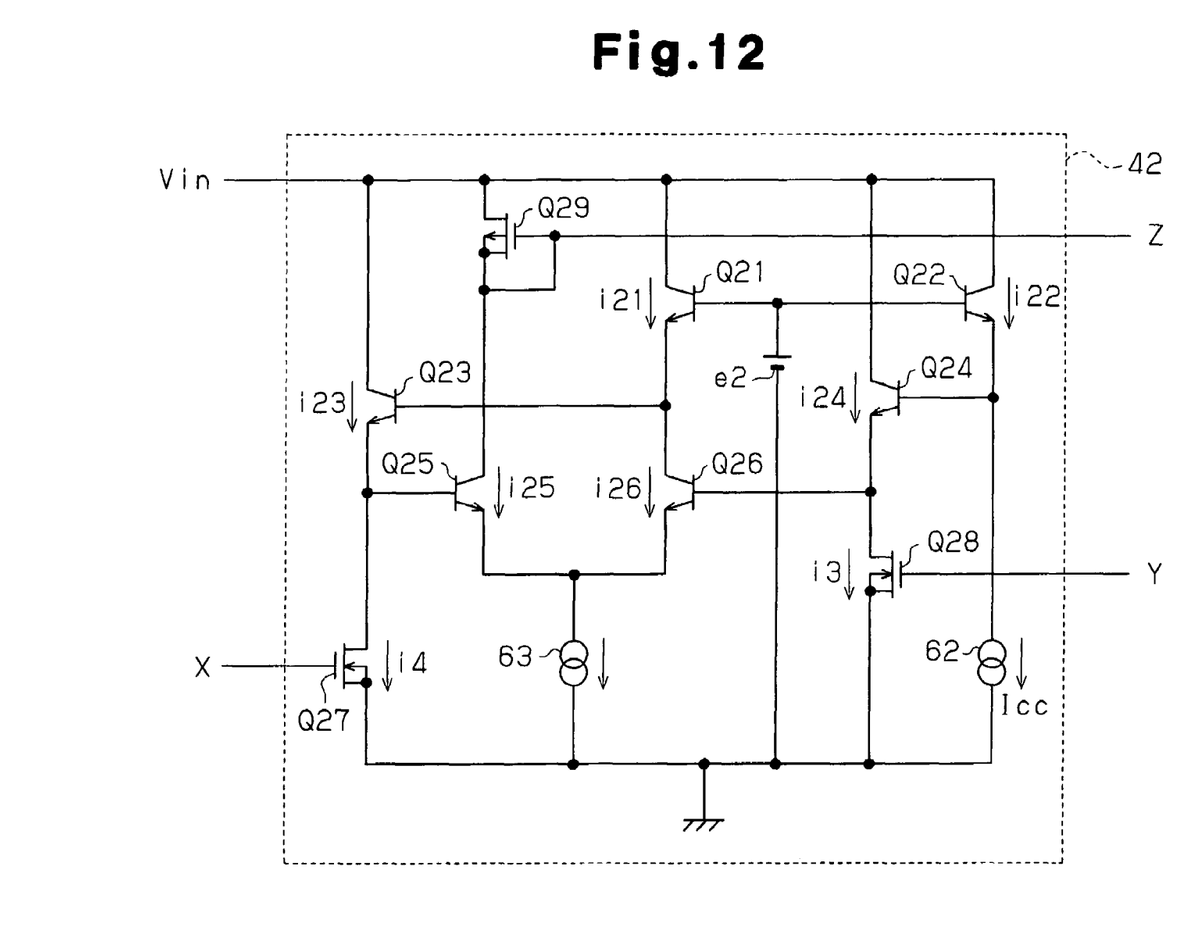
FIG. 12 is a schematic circuit diagram of a multiplier in the mode control circuit of FIG. 8.

FIG. 12 is a schematic circuit diagram of the multiplier 42 in the mode control circuit 36 of FIG. 8.

The collector of an NPN transistor Q21 is supplied with the input voltage Vin. The base of the transistor Q21 is connected to the base of an NPN transistor Q22. The emitter of the transistor Q21 is connected to the base of an NPN transistor Q23 and the collector of an NPN transistor Q26. The base of the transistor Q21 is connected to a bias power supply e2. The collector of the transistor Q22 is supplied with the input voltage Vin. The emitter of the transistor Q22 is connected to the base of an NPN transistor Q24 and a constant current supply 62.

The collector of the transistor Q24 is supplied with the input voltage Vin. The emitter of the transistor Q24 is connected to the base of the NPN transistor Q26 and the drain of an N-channel MOS transistor Q28. The source of the transistor Q28 is grounded.

The collector of the transistor Q23 is supplied with the input voltage Vin. The emitter of the transistor Q23 is connected to the base of an NPN transistor Q25 and the drain of an N-channel MOS transistor Q27. The source of the transistor Q27 is grounded. The collector of the transistor Q25 is connected to the drain of an MOS transistor Q29. The gate and the drain of the transistor Q29 are connected to each other. The source of the transistor Q29 is supplied with the input voltage Vin. The gate of the transistor Q29 is connected to an output terminal Z of the multiplier 42.

The emitter of the transistor Q25 and the emitter of the transistor Q26 are connected to each other. A node between the emitter of the transistor Q25 and the emitter of the transistor Q26 is grounded via the constant current supply 63. The gate of the transistor Q27 is connected to terminal X, as shown in FIG. 11. The gate of the transistor Q28 is connected to terminal Y, as shown in FIG. 11.

In the multiplier 42, the transistors Q21, Q23, and Q25 are connected to form a Darlington connection. In the same manner, the transistors Q22, Q24, and Q26 are connected to form a Darlington connection. The bases of the transistors Q21 and Q22 are connected to the bias power supply e2. The emitters of the transistors Q25 and Q26 are connected to the common constant current supply 63. Thus, the base-emitter voltage Vbe of the transistors Q21, Q23, and Q25, which are connected to form a Darlington connection, is equal to the base-emitter voltage Vbe of the transistors Q22, Q24, and Q26, which are connected to form a Darlington connection. When the currents flowing through the transistors Q21 to Q26 are i21 to i26, the currents are expressed as:

$$i21*i23*i25 \doteq i22*i24*i26$$

The transistor Q21 is connected in series to the transistor Q26. Thus, the current i21 flowing through the transistor Q21 is equal to the current i26 flowing through the transistor Q26. Thus, the above expression is transformed into $$i23*i25 \doteq i22*i24$$

By transforming this expression, the current i25 is expressed as:

$$i25 \doteq (i24/i23)*i22$$

The transistor Q23 is connected in series to the transistor Q27. The gate of the transistor Q27 is connected to the gate of the transistor T21 shown in FIG. 11. Accordingly, the transistor Q27 and the transistor T21 form a current mirror circuit. Thus, the current flowing through the transistor Q23 and the transistor Q27 is equal to the current i4 flowing through the transistor T21. The current i23 flowing through the transistor Q23 is expressed as:

$$i23 = i4(Vin-Vout)/R$$

In the same manner, the transistor Q24 is connected in series to the transistor Q28. The gate of the transistor Q28 is connected to the gate of the transistor T18 shown in FIG. 11. Accordingly, the transistor Q28 and the transistor T18 form a current mirror circuit. Thus, the current flowing through the transistor Q24 and the transistor Q28 is equal to the current i3 flowing through the transistor T18. The current i24 flowing through the transistor Q24 is expressed as $$i24 = i3Vin/R$$

The emitter of the transistor Q22 is connected to the constant current supply 62. The constant current supply 62 is set in a manner that the current Icc flows. The current i22 flowing through the transistor Q22 is equal to the current Icc.

As a result, the current i25 flowing through the transistor Q25 is expressed as:

$$i25 \doteq (i24/i23)*i22 \doteq ((Vin/R)/((Vin-Vout)/R))*Icc$$
$$\doteq (Vin/(Vin-Vout))*Icc$$

The transistor Q25 and the transistor Q29 are connected in series. The transistor Q29 operates as a diode. Thus, the current flowing through the transistor Q29 is equal to the current i25 flowing through the transistor Q25. As a result, the multiplier 42 generates a current equal to the current i25 flowing through the transistor Q25 at the output terminal Z that is connected to the gate of the transistor Q29.

The operation of the DC-DC converter 12 will now be described.

The input voltage Vin supplied from the battery 11 shown in FIG. 10 decreases as the electronics device 10 is used or as the battery 11 is discharged. The mode control circuit 36 of the DC-DC converter 12 monitors the input voltage Vin, the output voltage Vout, and the output current IL. Further, based on the input voltage Vin, the output voltage Vout, and the output current IL, the mode control circuit 36 generates a signal Iout that is in accordance with the load current when the efficiency η1 of the switching regulator and the efficiency η2 of the linear regulator are substantially the same. Further, the mode control circuit 36 compares the signal SI, which corresponds to the output current IL flowing through the current detection resistor Rs, with a signal Iout to generate a mode control circuit SM based on the comparison result. As a result, the DC-DC converter 12 is switched between the switching regulator and the linear regulator at the load current in which the efficiency η1 of the switching regulator and the efficiency η2 of the linear regulator are substantially the same.

[When Mode Control Signal SM has an H level]

The oscillator 33 performs an oscillation operation in response to an H level mode control signal SM to generate a triangular wave signal SS. The PWM comparator 32 operates in response to the H level mode control signal SM, compares the triangular wave signal SS with the first error signal S1a from the error amplifier 31, and generates a signal QL in accordance with the comparison result. The switch SW1 connects the common terminal Tc to the first switch terminal Ta in response to the H level mode control signal SM and provides the signal QL from the PWM comparator 32 to the output transistor T1 as a control signal DH. In response to the H level mode control signal SM, the AND circuit 34 provides the signal QL from the PWM comparator 32 to the output transistor T2 as a control signal DL. As a result, the output transistors T1 and T2 are activated and inactivated in a complementary manner.

The output voltage Vout increases during the period the output transistor T1 is activated. The output voltage Vout is smoothed by the smoothing capacitor C1. When the output transistor T1 is inactivated, the energy accumulated in the choke coil L1 is discharged. This decreases the energy accumulated in the choke coil L1 and decreases the output voltage Vout. When the comparison voltage V1 generated with the resistors R1 and R2 becomes lower than the reference voltage Vr1, the output transistor T1 is activated.

When the output voltage Vout increases, the voltage of the first error signal S1a from the error amplifier 31 decreases. Thus, the pulse width of the signal QL increases. As a result, the activation time of the output transistor T1 relatively decreases and lowers the potential at the output voltage Vout is lowered. When the output voltage Vout decreases, the voltage of the first error signal S1a from the error amplifier 31 increases. Thus, the pulse width of the signal QL decreases. As a result, the activation time of the output transistor T1 relatively increases. This raises the potential of the output voltage Vout. In this way, the DC-DC converter 12 operates as the switching regulator for activating and inactivating the output transistors T1 and T2 to maintain the output voltage Vout as a constant voltage that is based on the reference voltage Vr1.

[When Mode Control Signal SM has an L level]

The supply of the power supply voltage Vcc to the PWM comparator 32 and the triangular wave oscillator 33 is stopped in response to an L level mode control signal SM so that the PWM comparator 32 and the triangular wave oscillator 33 stop operating. The switch SW1 connects the common terminal Tc to the second switch terminal Tb in response to the L level mode control signal SM. As a result, the output transistor T1 is provided with a second error signal S1b as a control signal DH. The AND circuit 34 provides an L level control signal DL to the output transistor T2 in response to the L level mode control signal SM. As a result, the output transistor T2 is inactivated based on the L level control signal DL.

The error amplifier 31 amplifies the difference between the output voltage Vout and the reference voltage Vr1. As a result, the second error signal S1b output to the inverting output terminal of the error amplifier 31 has a lower voltage as the output voltage Vout becomes lower, and the second error signal S1b has a higher voltage as the output voltage Vout becomes higher and closer to the reference voltage Vr1.

The second error signal S1b is provided to the gate of the output transistor T1. When the output voltage Vout decreases, the gate voltage of the output transistor T1 decreases. The ON-resistance of the output transistor T1, which is a P-channel MOS transistor, decreases as its gate voltage decreases. As a result, the voltage drop that occurs in the output transistor T1 decreases, and the output voltage Vout increases.

In this way, the voltage of the second error signal S1b output to the inverting output terminal of the error amplifier 31 increases and the gate voltage of the output transistor T1 increases as the output voltage Vout increases. The ON-resistance of the output transistor T1, which is a P-channel MOS transistor, increases as its gate voltage increases. As a result, the voltage drop that occurs in the output transistor T1 increases, and the output voltage Vout decreases.

In this way, the second error signal S1b output to the inverting output terminal of the error amplifier 31 is provided to the gate of the output transistor T1. As a result, the DC-DC converter 12 operates as the linear regulator, and maintains the output voltage Vout as a constant voltage that is based on the reference voltage Vr1. The linear regulator does not require a switching operation. This keeps the ripple voltage of the output voltage Vout at an extremely low value. Further, elements other than the error amplifier 31 of the DC-DC converter 12, namely, the PWM comparator 32 and the triangular wave oscillator 33, stop operating. The power consumed in the PWM comparator 32 and the triangular wave oscillator 33 is the fixed loss of the DC-DC converter 12. Accordingly, the fixed loss in the controller 21 of the DC-DC converter 12 is reduced.

The DC-DC converter 12 of the first embodiment has the advantages described below.

The mode control circuit 36 monitors the input voltage Vin, the output voltage Vout, and the output current IL. The mode control circuit 36 generates the signal Iout in accordance with the load current in which the efficiency η1 of the switching regulator and the efficiency η2 of the linear regulator are substantially the same based on the input voltage Vin, the output voltage Vout, and the consumption current Icc of the controller 21. Further, the mode control circuit 36 compares the signal SI corresponding to the output current IL flowing through the current detection resistor Rs with the signal Iout to generate the mode control signal SM based on the comparison result. The controller 21 operates the DC-DC converter 12 as the switching regulator or the linear regulator based on the mode control signal SM. This prevents the occurrence of problems such as the operation mode of the DC-DC converter 12 not being switched to the regulator having higher conversion efficiency as shown in FIG. 5 or the operation mode being switched to the regulator having lower conversion efficiency as shown in FIG. 6. Accordingly, the conversion efficiency of the DC-DC converter 12 varies in a continuous manner and prevents the conversion efficiency of the DC-DC converter 12 from being lowered when the operation mode of the DC-DC converter 12 is switched.

The controller 21 activates and inactivates the first output transistor T1 and the second output transistor T2 in a complementary manner in the PWM operation mode to operate the DC-DC converter 12 as the switching regulator. The controller 21 inactivates the second output transistor T2 and controls the ON-resistance of the first output transistor T1 in the linear operation mode to operate the DC-DC converter 12 as the linear regulator. As a result, the DC-DC converter 12 operates as the switching regulator or the linear regulator in accordance with the output voltage Vout. This reduces the area of the entire system as compared with when the switching regulator and linear regulator are separate and prevents the area of the system from increasing.

At least one of the triangular wave oscillator 33 and the PWM comparator 32 stops operating in the linear operation mode based on the mode control signal SM. As a result, the DC-DC converter 12 reduces power consumption and realizes high conversion efficiency.

A DC-DC converter 70 according to a second embodiment of the present invention will now be described with reference to the drawing.

Figure 13:
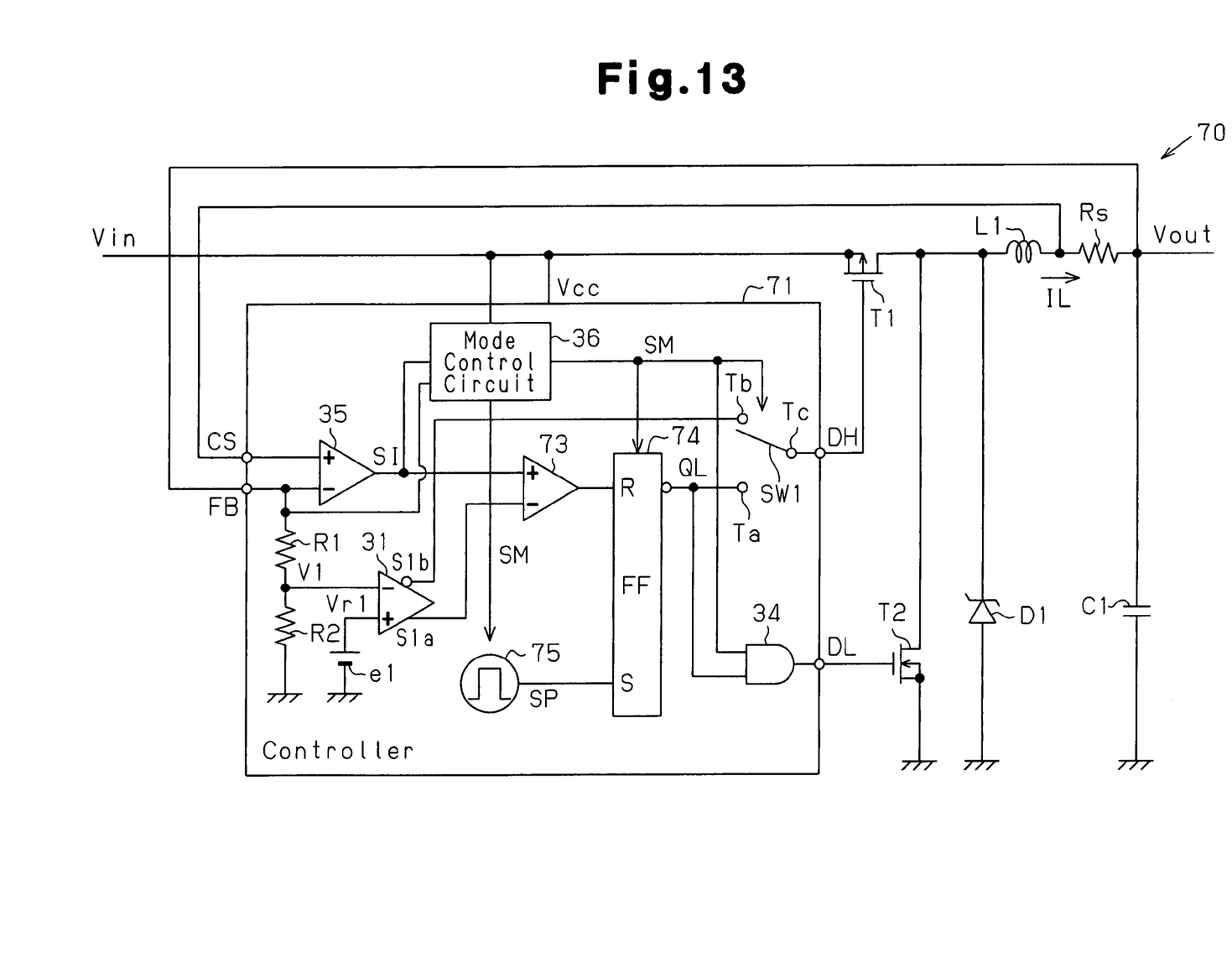
FIG. 13 is a schematic block diagram of a DC-DC converter according to a second embodiment of the present invention.

FIG. 13 is a schematic block diagram of the DC-DC converter 70 in the second embodiment. The DC-DC converter 70, which is a current control mode DC-DC converter, includes a controller 71, output transistors T1 and T2, a choke coil L1, a smoothing capacitor C1, a diode D1, and a current detection resistor Rs. Output voltage Vout is output via the current detection resistor Rs.

In the controller 71, a voltage amplifier 35 has a non-inverting input terminal provided with a feedback signal CS and an inverting input terminal provided with a feedback signal FB. The voltage amplifier 35 amplifies the voltage produced between the two terminals of the current detection resistor Rs based on the output current flowing through the current detection resistor Rs to provide a mode control circuit 36 and a comparator 73 with an amplified signal SI. An error amplifier 31 of the controller 71 amplifies the voltage difference between a comparison voltage V1 and a reference voltage Vrl to generate error signals S1a and S1b. The comparison voltage V1 is obtained by dividing the voltage of the feedback signal FB (that is, the output voltage Vout) with the resistors R1 and R2. The reference voltage Vr1 is supplied from a reference power supply e1. The first error signal S1a is provided to the comparator 73. The second error signal S1b is provided to a switch SW1.

The comparator 73 compares the output voltage of the voltage amplifier 35 and the voltage of the first error signal S1a from the error amplifier 31. The comparator 73 provides an H level output signal to the reset terminal R of a flip-flop circuit (FF circuit) 74 when the output voltage of the voltage amplifier 35 is higher than the voltage of the first error amplifier signal S1a. The comparator 73 provides an L level output signal to the reset terminal R when the output voltage of the voltage amplifier 35 is lower than the voltage of the first error signal S1a.

The set terminal S of the FF circuit 74 is provided with a pulse signal having a constant frequency from an oscillator 75. The FF circuit 74 outputs an L level output signal QL to an inverting output terminal /Q when a set terminal S is provided with an H level signal. The FF circuit 74 outputs an H level output signal QL to the inverting output terminal /Q when a reset terminal R is provided with an H level signal.

The output voltage of the voltage amplifier 35 is supplied to the mode control circuit 36. The mode control circuit 36 generates a mode control signal SM based on the output voltage of the voltage amplifier 35. The output voltage of the voltage amplifier 35 corresponds to the voltage difference between the feedback signals CS and FB, that is, the output current of the DC-DC converter 70. The mode control circuit 36 detects the output current of the DC-DC converter 70 to generate a mode control signal SM for changing the operation mode of the DC-DC converter 70 in accordance with the detection result. The mode control signal SM is provided to the switch SW1, the AND circuit 34, the FF circuit 74, and the oscillator 75.

The switch SW1 and the AND circuit 34 are connected to the inverting output terminal of the FF circuit 74. The switch SW1 has two switch terminals Ta and Tb and a common terminal Tc. The first switch terminal Ta is provided with the signal QL. The second switch terminal Tb is provided with the second error signal S1b. The common terminal Tc of the switch SW1 is connected to the gate of the output transistor T1. The switch SW1 connects the common terminal Tc to the first switch terminal Ta or the second switch terminal Tb in response to the mode control signal SM that is provided from the mode control circuit 36. Thus, the switch SW1 selects one of the signal QL and the second error signal S1b to output a control signal DH corresponding to the selected signal to the common terminal Tc. The control signal DH is provided to the output transistor T1. The output transistor T1 operates in response to the control signal DH.

The AND circuit 34 is a logic circuit having two input terminals. The first input terminal of the AND circuit 34 is provided with the signal QL. The second input terminal of the AND circuit 34 is provided with the mode control signal SM. The output terminal of the AND circuit 34 is connected to the gate of the output transistor T2. The AND circuit 34 performs an AND operation with the signal QL and the mode control signal SM to generate a control signal DL indicating the operation result. The control signal DL is set at an H level when the signal QL and the mode control signal SM both have an H level and is set at an L level when at least one of the signal QL and the mode control signal SM has an L level. The control signal DL is provided to the output transistor T2. The output transistor T2 is activated and inactivated in response to the control signal DL.

The oscillator 75 performs oscillation in response to an H level mode control signal SM in the same manner as the triangular wave oscillator 33 of the first embodiment to generate a pulse signal SP having a predetermined frequency. Further, in the same manner as the PWM comparator 32 of the first embodiment, the FF circuit 74 is formed in a manner that the supply of the power supply voltage to the element forming the FF circuit 74 is started or stopped according to the mode control signal SM.

The operation of the DC-DC converter 70 will now be described.

The input voltage Vin supplied from the battery 11 shown in FIG. 10 decreases as the electronics device 10 is used or as the battery 11 is discharged. The mode control circuit 36 of the DC-DC converter 70 monitors the input voltage Vin, the output voltage Vout, and the output current IL to generate a signal Iout in accordance with the load current in which the efficiency η1 of the switching regulator and the efficiency η2 of the linear regulator are substantially the same based on the input voltage Vin, the output voltage Vout, and the output current IL. Further, the mode control circuit 36 compares the signal SI corresponding to the output current IL flowing through the current detection resistor Rs with a signal Iout to generate a mode control circuit SM based on the comparison result. As a result, the DC-DC converter 70 is switched between the switching regulator and the linear regulator at the load current with which the efficiency η1 of the switching regulator and the efficiency η2 of the linear regulator substantially coincide with each other.

[When Mode Control Signal SM has an H level]

The oscillator 75 performs an oscillation operation in response to an H level mode control signal SM to generate a pulse signal SP. The FF circuit 74 operates in response to the H level mode control signal SM. The switch SW1 connects the common terminal Tc to the first switch terminal Ta in response to the H level mode control signal SM. The AND circuit 34 provides the signal DL having the same phase as the output signal QL of the FF circuit 74 in response to the H level mode control signal SM.

Thus, the controller 71 activates the output transistor T1 in fixed cycles in response to the rise of the pulse signal SP provided from the oscillator 75. When the output transistor T1 is activated, the current IL flowing through the choke coil L1 and the current detection resistor Rs increases. This increases the output voltage of the voltage amplifier 35. When the output voltage of the voltage amplifier 35 becomes greater than the voltage of the first error signal S1a from the error amplifier 31, the reset terminal R of the FF circuit 74 is provided with an H level signal. As a result, the output transistor T1 is inactivated and the output transistor T2 is activated. Thus, the energy accumulated in the choke coil L1 is discharged via the output transistor T2.

The output voltage Vout decreases when the output transistors T1 and T2 are activated and inactivated as described above. In this case, the voltage of the first error signal S1a from the error amplifier 31 increases. This extends the time until the output signal of the comparator 73 is set at an H level. As a result, the activation time of the output transistor T1 is relatively increased, and the potential of the output voltage Vout is raised. When the output voltage Vout increases, the voltage of the first error signal S1a from the error amplifier 31 decreases. This shortens the time until the output signal of the comparator 73 is set at an H level. As a result, the activation time of the output transistor T1 relatively decreases, and the potential of the output voltage Vout is lowered. With this operation, the output transistor T1 is activated in fixed cycles based on the frequency of the output signal of the oscillator 75, and the timing at which the output transistor T1 is inactivated is determined based on the increase in the output current IL. The timing at which the output transistor T1 is inactivated changes in accordance with the level of the output voltage Vout. As a result, the output voltage Vout remains constant.

[When Mode Control Signal SM has an L Level]

The oscillator 75 and the FF circuit 74 stop operating in response to an L level mode control signal SM. The switch SW1 connects the common terminal Tc to the second switch terminal Tb in response to the L level mode control signal SM. The AND circuit 34 generates an L level control signal DL in response to the L level mode control signal SM.

The controller 71 inactivates the output transistor T2 and controls the ON-resistance of the output transistor T1 based on the second error signal S1b. In other words, the DC-DC converter 70 operates as the linear regulator, and maintains the output voltage Vout as a constant voltage that is based on the reference voltage Vr1. The linear regulator does not require a switching operation, Thus, the ripple voltage of the output voltage Vout is reduced to an extremely low level. Further, elements other than the error amplifier 31 and the voltage amplifier 35 of the DC-DC converter 70, namely, the FF circuit 74 and the oscillator 75, stop operating. The consumption power in the FF circuit 74 and the oscillator 75 is the fixed loss of the DC-DC converter 70. Accordingly, the fixed loss of the controller 71 for the DC-DC converter 70 is reduced.

The DC-DC converter 70 of the second embodiment has the advantages described below.

The DC-DC converter 70, which is a current control mode DC-DC converter, detects the current IL flowing through the current detection resistor Rs and maintains the output voltage Vout as a constant voltage. The operation mode of the DC-DC converter 70 is switched in a manner that the conversion efficiency of the DC-DC converter 70 varies continuously in the same manner as in the first embodiment. As a result, the DC-DC converter 70 has high conversion efficiency even when the input voltage Vin changes.

The controller 71 of the DC-DC converter 70 selects either the PWM operation mode or the linear operation mode in accordance with the output current IL to operate the DC-DC converter 70 as the switching regulator or the linear regulator in accordance with the selected operation mode in the same manner as in the first embodiment. This realizes high conversion efficiency of the DC-DC converter 70 and prevents the system area from increasing.

The above embodiments may be applied to a DC-DC converter in which a linear regulator and a switching regulator are formed separately.

The above embodiments may be modified so that the operation mode of the DC-DC converter is switched between regulators other than the types described in the above embodiments. For example, the present invention is applicable to a DC-DC converter for which the operation mode is switched to a PWM switching regulator where the frequency of a triangular wave signal is set to be low. Further, the present invention is applicable to a DC-DC converter in which the operation mode is switched between a PWM switching regulator, a PFM (pulse frequency modulation) switching regulator for changing the switching frequency of the PWM switching regulator according to a load current, and a linear regulator.

The present examples and embodiments are to be considered as illustrative and not restrictive, and the invention is not to be limited to the details given herein, but may be modified within the scope and equivalence of the appended claims.

What is claimed is:

1. A DC-DC converter comprising:
   a first transistor receiving input voltage;
   a second transistor coupled in series to the first transistor; and
   a controller controlling the first transistor and the second transistor to select either one of a first mode in which the DC-DC converter operates as a switching regulator and a second mode in which the DC-DC converter operates as a linear regulator,
   wherein output voltage and output current changing in accordance with the output voltage are generated through a node between the first transistor and the second transistor, and
   wherein the controller includes a mode control circuit which monitors the input voltage, the output voltage, and the output current, the mode control circuit including:
      a multiplier which determines a load current in which efficiency of the switching regulator and efficiency of the linear regulator are substantially the same based on a consumption current consumed in the controller, a monitored input voltage and a monitored output voltage, and
      a comparator which compares the load current with a monitored output current, and generates a mode control signal for selecting the one of the first mode and the second mode based on a comparing result.

2. The DC-DC converter according to claim 1, further comprising:
   a choke coil coupled to the node between the first transistor and the second transistor; and
   a smoothing capacitor, coupled to the choke coil, for smoothing the output voltage;
   wherein the controller activates and inactivates the first transistor and the second transistor in a complementary manner during the first mode, and the controller inactivates the second transistor and performs linear operation with the first transistor during the second mode.

3. The DC-DC converter according to claim 1, wherein the controller includes:
   an error amplifier for comparing the output voltage with a reference voltage and generating an error signal in accordance with the comparison result;
   a triangular wave oscillator for generating a triangular wave signal;
   a PWM comparator, coupled to the error amplifier and the triangular wave oscillator, for comparing the error signal and the triangular wave signal and generating a switching control signal in accordance with the comparison result
   a selection circuit, coupled to the mode control circuit, the error amplifier, the PWM comparator, and the first transistor, for providing, in response to the mode control signal, the first transistor with the switching control signal during the first mode and the first transistor with the error signal during the second mode; and
   a signal control circuit, coupled to the mode control circuit, the PWM comparator, and the second transistor, for providing, in accordance with the mode control signal, the second transistor with the switching control signal during the first mode and generating a gate signal for inactivating the second transistor during the second mode.

4. The DC-DC converter according to claim 3, wherein at least one of the triangular wave oscillator and the PWM comparator stops operating during the second mode in accordance with the mode control signal.

5. The DC-DC converter according to claim 1, wherein the mode control circuit further includes:
   an operational amplifier for generating amplified voltage in accordance with the difference between the monitored input voltage and the monitored output voltage;
   wherein the multiplier is coupled to the operational amplifier and determines the load current based on the monitored input voltage, the amplified voltage, and the predetermined consumption current.

6. A controller for a DC-DC converter including a first transistor receiving input voltage and a second transistor coupled in series to the first transistor, the controller comprising:
   a circuit controlling the first transistor and the second transistor to select either one of a first mode in which the DC-DC converter operates as a switching regulator and a second mode in which the DC-DC converter operates as a linear regulator,
   wherein output voltage and output current changing in accordance with the output voltage are generated through a node between the first transistor and the second transistor, and
   wherein the circuit includes a mode control circuit which monitors the input voltage, the output voltage, and the output current, the mode control circuit including:
      a multiplier which determines a load current in which efficiency of the switching regulator and efficiency of the linear regulator are substantially the same based on a consumption current consumed in the controller, a monitored input voltage and a monitored output voltage, and
      a comparator which compares the load current with a monitored output current, and generates a mode control signal for selecting the one of the first mode and the second mode based on a comparing result.

7. The controller according to claim 6, wherein the DC-DC converter further includes:
   a choke coil coupled to the node between the first transistor and the second transistor; and
   a smoothing capacitor, coupled to the choke coil, for smoothing the output voltage;
   wherein the circuit activates and inactivates the first transistor and the second transistor in a complementary manner during the first mode, and the circuit inactivates the second transistor and performs linear operation with the first transistor during the second mode.

8. The controller according to claim 6, wherein the circuit includes:
   an error amplifier for comparing the output voltage with a reference voltage and generating an error signal in accordance with the comparison result;
   a triangular wave oscillator for generating a triangular wave signal;
   a PWM comparator, coupled to the error amplifier and the triangular wave oscillator, for comparing the error signal and the triangular wave signal and generating a switching control signal in accordance with the comparison result
   a selection circuit, coupled to the mode control circuit, the error amplifier, the PWM comparator, and the first transistor, for providing, in response to the mode control signal, the first transistor with the switching control signal during the first mode and the first transistor with the error signal during the second mode; and
   a signal control circuit, coupled to the mode control circuit, the PWM comparator, and the second transistor, for providing, in accordance with the mode control signal, the second transistor with the switching control signal during the first mode and generating a gate signal for inactivating the second transistor during the second mode.

9. The controller according to claim 8, wherein at least one of the triangular wave oscillator and the PWM comparator stops operating during the second mode in accordance with the mode control signal.

10. The controller according to claim 6, wherein the mode control circuit further includes:
    an operational amplifier for generating amplified voltage in accordance with the difference between the monitored input voltage and the monitored output voltage;
    wherein the multiplier is coupled to the operational amplifier and determines the load current based on the monitored input voltage, the amplified voltage, and the predetermined consumption current.

11. A method for controlling a DC-DC converter that includes a first transistor receiving input voltage, a second transistor coupled in series to the first transistor, and a controller which controls the first transistor and the second transistor to select either one of a first mode in which the DC-DC converter operates as a switching regulator and a second mode in which the DC-DC converter operates as a linear regulator, wherein output voltage and output current changing in accordance with the output voltage are generated through a node between the first transistor and the second transistor, the method comprising:
    monitoring the input voltage, the output voltage, and the output current;
    determining a load current in which efficiency of the switching regulator and efficiency of the linear regulator are substantially the same based on a consumption current to be consumed in the controller, a monitored input voltage, and a monitored output voltage;
    comparing the load current with a monitored output current; and
    based on a comparing result, generating a mode control signal for selecting one of the first mode and the second mode.

12. The method according to claim 11, further comprising:
    activating and inactivating the first transistor and the second transistor in a complementary manner during the first mode; and
    inactivating the second transistor and performing linear operation with the first transistor during the second mode.

13. The method according to claim 12, further comprising:
    comparing the output voltage with a reference voltage and generating an error signal in accordance with the comparison result;
    generating a triangular wave signal;
    comparing the error signal and the triangular wave signal and generating a switching control signal in accordance with the comparison result;
    wherein said activating and inactivating the first transistor and the second transistor in a complementary manner during the first mode includes:
       providing the first transistor with the switching control signal in response to the mode control signal; and
       providing the second transistor with the switching control signal in response to the mode control signal; and
    wherein said inactivating the second transistor and performing linear operation with the first transistor during the second mode includes:
       providing the first transistor with the error signal in response to the mode control signal; and
       generating a gate signal for inactivating the second transistor based on the mode control signal.

14. The method according to claim 13, further comprising: stopping the generation of at least either one of the triangular wave signal and the switching control signal in accordance with the mode control signal.

15. The DC-DC converter according to claim 1, wherein the load current changes in accordance with a difference between the monitored input voltage and the monitored output voltage.

16. The controller according to claim 6, wherein the load current changes in accordance with a difference between the monitored input voltage and the monitored output voltage.

17. The method according to claim 11, wherein the load current changes in accordance with a difference between the monitored input voltage and the monitored output voltage.

* * * * *